(12) United States Patent
Ji et al.

(10) Patent No.: US 8,769,662 B2
(45) Date of Patent: Jul. 1, 2014

(54) METHODS, SYSTEMS, AND COMPUTER PROGRAM PRODUCTS FOR PROTECTING AGAINST IP PREFIX HIJACKING

(71) Applicant: AT&T Intellectual Property I, L.P., Reno, NV (US)

(72) Inventors: Lusheng Ji, Randolph, NJ (US); Dan Pei, Jersey City, NJ (US); Jia Wang, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/657,350

(22) Filed: Oct. 22, 2012

(65) Prior Publication Data
US 2013/0074175 A1    Mar. 21, 2013

Related U.S. Application Data

(63) Continuation of application No. 12/632,201, filed on Dec. 7, 2009, now Pat. No. 8,296,838.

(51) Int. Cl.
*G06F 15/16* (2006.01)
*G06F 9/00* (2006.01)
*G06F 17/00* (2006.01)

(52) U.S. Cl.
USPC .............. 726/12; 713/153; 713/166; 726/14; 370/248; 370/351; 370/371; 370/389

(58) Field of Classification Search
None
See application file for complete search history.

(56) References Cited

U.S. PATENT DOCUMENTS

| | | | |
|---|---|---|---|
| 7,035,223 B1 * | 4/2006 | Burchfiel et al. | 370/248 |
| 7,920,558 B2 * | 4/2011 | He | 370/389 |
| 2004/0246954 A1 * | 12/2004 | Yarger et al. | 370/371 |
| 2007/0153763 A1 * | 7/2007 | Rampolla et al. | 370/351 |
| 2007/0198826 A1 * | 8/2007 | Grosse | 713/153 |
| 2008/0133716 A1 * | 6/2008 | Rao et al. | 709/220 |
| 2010/0263041 A1 * | 10/2010 | Shea | 726/14 |
| 2011/0066851 A1 * | 3/2011 | Bello et al. | 713/166 |

* cited by examiner

*Primary Examiner* — Shin-Hon Chen
(74) *Attorney, Agent, or Firm* — Myers Bigel Sibley & Sajovec, PA

(57) ABSTRACT

A communication network is operated by identifying at least one potential hijack autonomous system (AS) that can be used to generate a corrupt routing path from a source AS to a destination AS. For each of the at least one potential hijack AS the following operations are performed: identifying at least one regional AS that is configured to adopt the corrupt routing path from the source AS to the destination AS and determining a reflector AS set such that, for each reflector AS in the set, a source AS to reflector AS routing path and a reflector AS to destination AS routing path do not comprise any of the at least one regional AS. A reflector AS is then identified that is common among the at least one reflector AS set responsive to performing the identifying and determining operations for each, of the at least one potential hijack AS.

13 Claims, 3 Drawing Sheets

METHODS, SYSTEMS, AND COMPUTER PROGRAM PRODUCTS FOR PROTECTING AGAINST IP PREFIX HIJACKING

RELATED APPLICATION

This application is a continuation of U.S. application Ser. No. 12/632,201, filed Dec. 7, 2009, now U.S. Pat. No. 8,296,838, the disclosure of which is hereby incorporated herein by reference as if set forth in its entirety.

BACKGROUND OF THE INVENTION

The present application relates generally to communication networks, and, more particularly, to methods, systems, and computer program products for protecting against Internet Protocol (IP) prefix attacks.

The inter-domain routing infrastructure of the global Internal consists of tens of thousands of independently administrated networks known as Autonomous Systems (ASes) and a collection of special routers that situate at borders of these ASes and execute the Border Gateway Protocol (BGP) to manage AS level routing.

BGP routers exchange and propagate route information amongst themselves through special route announcement messages. In BGP, in its simplest form, an AS level route on a BGP router can be represented as a quintuple listing the destination IP address block (which is known as "destination IP address prefix" or simply "prefix") and the "best" known AS level path to reach this prefix from the AS that the BGP router belongs. Traffic destined for an IP address is matched to the route entry with the most specific IP address prefix (longest match) that covers the destination IP address and forwarded to the first AS of the route entry's AS path as the next AS hop.

After a BGP router learns about a new route, it will add a corresponding route entry into its routing table and send its neighboring BGP routers a modified announcement which is created by appending its own AS identifier to the received AS path. If an announcement for a route change is received, a BGP router processes the announcement similarly except that it will only accept and propagate a changed route if the new route is "better" than the current route.

One particular threat that this routing infrastructure faces is so called "prefix hijacking" attacks. It is possible for an ill-intentioned BGP router or BGP router that is not functioning properly to announce a false AS level route towards a prefix. If a BGP router is polluted by this announcement and replaces the legitimate route entry for this prefix with the false route in its routing table, any future IP data traffic destined for any IP address within the victim prefix will be forwarded along this false route, causing such traffic being unrightfully intercepted, manipulated, or dropped—a result often referred to as IP traffic being "hijacked." Furthermore, this affected router may propagate the false route to its neighboring BGP routers to spread the false information, causing more IP data traffic being hijacked.

One key to a successful hijack attack is to make the false route appear to be "better" than the existing route. Which route is "better" is subject to each BGP router's own interpretation. For example, a path's AS level hop count is a commonly used metric. In general, the less ASes a path contains the better it is. Another commonly used metric is AS relationship. BGP routers often tend to favor forwarding data along the direction that maximizes profit. Thus, AS forwarding behaviors often observe the so called "valley free" property—a link towards a customer AS is more favored than a link towards a peer AS, and is further favored than a link towards a provider AS.

Because a false path generally becomes less and less attractive as it is propagated, e.g., the AS path gets longer as the announcement propagates, at some point routers stop accepting the false route because their existing routes are considered better. Therefore the propagation of a false route is typically limited to a region surrounding the hijacker router, which may be called the affected region. If a source is sending data addressed for the victim prefix and the path from the source towards the victim prefix passes through the affected region, the source risks its data being hijacked.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments, a communication network is operated by identifying at least one potential hijack autonomous system (AS) that can be used to generate a corrupt routing path from a source AS to a destination AS. For each of the at least one potential hijack AS the following operations are performed: identifying at least one regional AS that is configured to adopt the corrupt routing path from the source AS to the destination AS and determining a reflector AS set such that, for each reflector AS in the set, a source AS to reflector AS routing path and a reflector AS to destination AS routing path do not comprise any of the at least one regional AS. A reflector AS is then identified that is common among the at least one reflector AS set responsive to performing the identifying and determining operations for each of the at least one potential hijack AS.

In other embodiments, the method further comprises detecting that the routing path from the source AS to the destination AS has been corrupted and directing communication traffic from the source AS to the destination AS through the reflector AS.

In still other embodiments, the method further comprises determining, for each of the at least one potential hijack AS, a mirror AS set such that, for each mirror as in the set, a source AS to mirror AS routing path does not comprise any of the at least one regional AS and identifying a mirror AS that is common among the at least one mirror AS set responsive to performing the identifying and determining the mirror AS set operations for each of the at least one potential hijack AS.

In still other embodiments, the method further comprises mirroring functionality provided for the destination AS at the identified mirror AS, detecting that the routing path from the source AS to the destination AS has been corrupted, and re-directing communication traffic from the source AS destined for the destination AS to the mirror AS without forwarding to the destination AS.

In still other embodiments, the method further comprises determining at least one source AS such that a sum of communication traffic from the at least one source AS exceeds a defined threshold and performing the identifying the at least one potential hijack AS, identifying the at least one regional AS, determining the reflector AS set, and identifying the reflector AS operations for each of the determined at least one source AS to generate a reflector AS set for the determined at least one source AS.

In still other embodiments, the method further comprises selecting at least one reflector AS from the reflector AS set for the determined at least one source AS for elimination based on a number of the at least one source AS for which each reflector AS in the reflector AS set for the determined at least one source was identified.

In still other embodiments, identifying the at least one potential hijack AS comprises identifying the at least one potential hijack AS based on routing preference rules used in the communication network.

In still other embodiments, the routing preference rules are based on at least one of AS hop count and AS relationship information and the AS relationship information specifies at least one of customer, peer, and provider relationship information between ASes.

In still other embodiments, identifying the at least one regional AS that is configured to adopt the corrupt routing path for each of the at least one potential hijack AS comprises identifying the at least one regional AS that is configured to adopt the corrupt routing path for each of the at least one potential hijack AS based on routing preference rules used in the communication network.

In further embodiments, a system for operating a communication network, comprises a hijack mitigation server that is configured to identify at least one potential hijack autonomous system (AS) that can be used to generate a corrupt routing path from a source AS to a destination AS. For each of the at least one potential hijack AS, the hijack mitigation server is configured to identify at least one regional AS that is configured to adopt the corrupt routing path from the source AS to the destination AS and determine a reflector AS set such that, for each reflector AS in the set, a source AS to reflector AS routing path and a reflector AS to destination AS routing path do not comprise any of the at least one regional AS. The hijack mitigation server is then configured to identify a reflector AS that is common among the at least one reflector AS set responsive to performing the identifying and determining operations for each of the at least one potential hijack AS.

In still further embodiments, the hijack mitigation server is further configured to detect that the routing path from the source AS to the destination AS has been corrupted and direct communication traffic from the source AS to the destination AS through the reflector AS.

In still further embodiments, the hijack mitigation server is further configured to determine, for each of the at least one potential hijack AS, a mirror AS set such that, for each mirror as in the set, a source AS to mirror AS routing path does not comprise any of the at least one regional AS and identify a mirror AS that is common among the at least one mirror AS set responsive to performing the identifying and determining the mirror AS set operations for each of the at least one potential hijack AS.

In still further embodiments, the hijack mitigation server is further configured to mirror functionality provided for the destination AS at the identified mirror AS, detect that the routing path from the source AS to the destination AS has been corrupted, and re-direct communication traffic from the source AS destined for the destination AS to the mirror AS without forwarding to the destination AS.

In still further embodiments, the hijack mitigation server is further configured to determine at least one source AS such that a sum of communication traffic from the at least one source AS exceeds a defined threshold and perform the identifying the at least one potential hijack AS, identifying the at least one regional AS, determining the reflector AS set, and identifying the reflector AS operations for each of the determined at least one source AS to generate a reflector AS set for the determined at least one source AS.

In still further embodiments, the hijack mitigation server is further configured to select at least one reflector AS from the reflector AS set for the determined at least one source AS for elimination based on a number of the at least one source AS for which each reflector AS in the reflector AS set for the determined at least one source was identified.

In still further embodiments, the hijack mitigation server is further configured to identity the at least one potential hijack AS by identifying the at least one potential hijack AS based on routing preference rules used in the communication network.

In still further embodiments, the routing preference rules are based on at least one of AS hop count and AS relationship information and the AS relationship information specifies at least one of customer, peer, and provider relationship information between ASes.

In still further embodiments, the hijack mitigation server is further configured to identify the at least one regional AS that is configured to adopt the corrupt routing path for each of the at least one potential hijack AS comprises by identifying the at least one regional AS that is configured to adopt the corrupt routing path for each of the at least one potential hijack AS based on routing preference rules used in the communication network.

In other embodiments, a computer program product for operating a communication network comprises a computer readable storage medium having computer readable program code embodied therein. The computer readable program code comprises computer readable program code configured to identify at least one potential hijack autonomous system (AS) that can be used to generate a corrupt routing path from a source AS to a destination AS and computer readable program code configured, for each of the at least one potential hijack AS, to: identify at least one regional AS that is configured to adopt the corrupt routing path from the source AS to the destination AS and determine a reflector AS set such that, for each reflector AS in the set, a source AS to reflector AS routing path and a reflector AS to destination AS routing path do not comprise any of the at least one regional AS. The computer readable program code further comprises computer readable program code configured to then identify a reflector AS that is common among the at least one reflector AS set responsive to performing the identifying and determining operations for each of the at least one potential hijack AS.

In still other embodiments, the computer program product further comprises computer readable program code configured to detect that the routing path from the source AS to the destination AS has been corrupted and computer readable program code configured to direct communication traffic from the source AS to the destination AS through the reflector AS.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
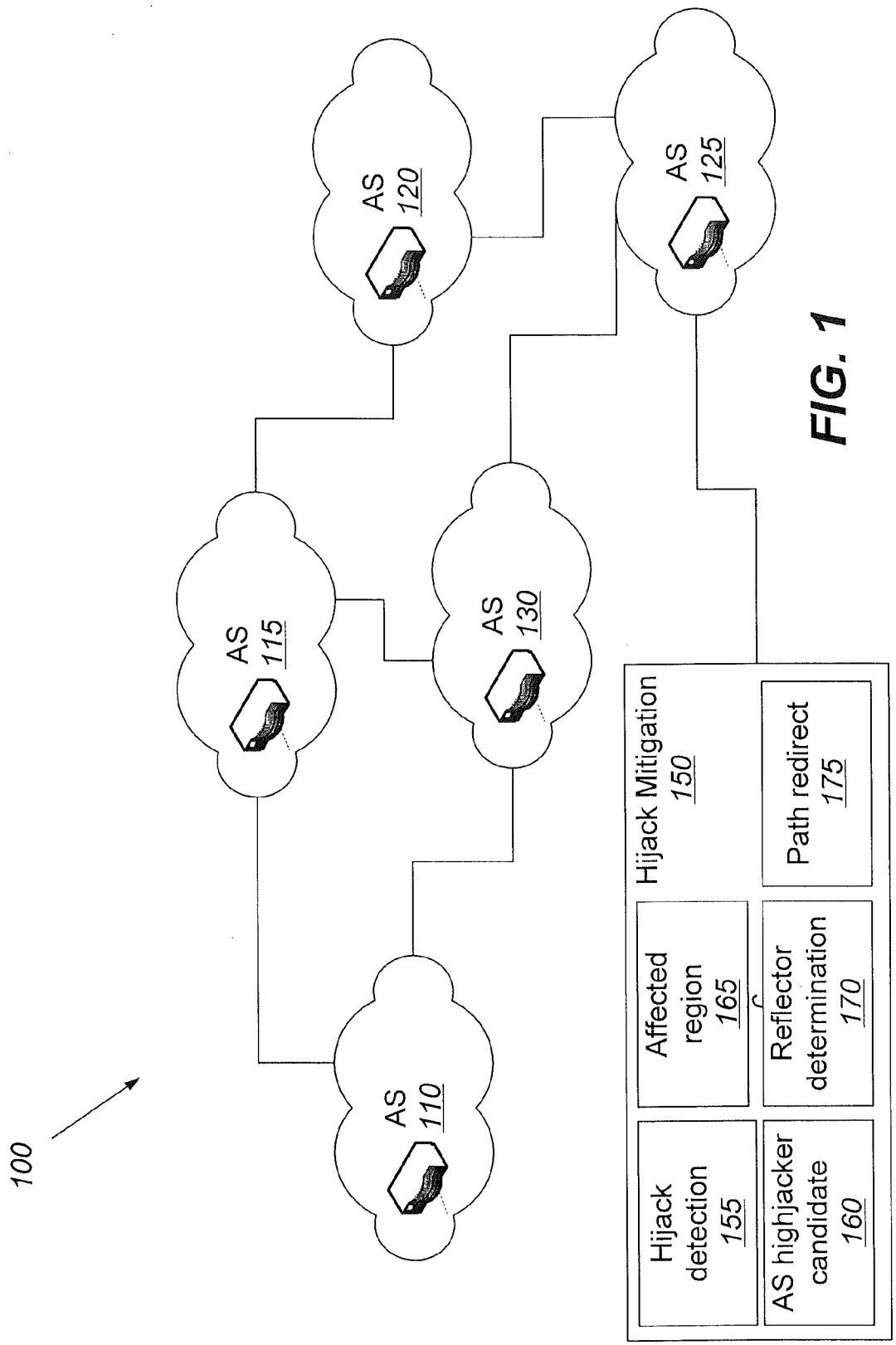
FIG. 1 is a block diagram that illustrates a communication network in accordance with some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments described herein relate to Internet Protocol (IP) prefix hijack mitigation. That is, after an IP prefix hijacking attack occurs, the prefix hijack mitigation embodiments may help the Internet infrastructure and the Internet Service Provider serving the victim prefix to restore data service for the victim prefix.

In some embodiments, a distributed prefix hijack mitigation framework for customers (prefixes) may be created by diversely and strategically deploying one or more nodes known as "reflectors" in one or more Autonomous Systems (ASes) on the Internet. Upon detecting an on-going hijacking attack and the location of the hijacker, at least one reflector for the customer prefix's potential source or source region that is affected by the attack is determined. Traffic that is originated from this affected source region and destined to the protected customer prefix is redirected towards a reflector. The reflector, in turn, "reflects" such traffic towards the prefix. The particular AS locations for reflector deployments may ensure that, subject to a determinable probability for a protected customer regardless where the hijacker may be located, there exist s some reflector(s) that are not affected by the hijacker so they can be used for relaying traffic during prefix hijacking attacks.

Referring now to FIG. 1, an exemplary communication network 100 that includes a prefix hijack mitigation system, according to some embodiments, will now be described. The communication network 100 comprises a combination of multiple ASes 110, 115, 120, 125, and 130 that are configured as shown. An AS is a collection of networks, each of which is configured to use IP addresses that can be described by one or more IP prefixes under the control of one autonomous administrative body that presents a common, clearly defined routing policy to the Internet. ASes communicate using the Border Gateway Protocol (BGP). Routers in the various ASes maintain respective tables of IP networks or prefixes, which designate network reachability among the various ASes. As discussed above, a malicious network user may corrupt the BGP routing tables used in the various ASes. For example, the best routing path between AS 110 and AS 125 may be via AS 130. A malicious user in AS 115 may corrupt the BGP routing tables such that communication traffic from AS 110 to AS 125 is sent via AS 115 and AS 130. The malicious user may then intercept the communication traffic in AS 115 for undesirable purposes. In another example, a malicious network user may simply replace the endpoint in the communication path with a substitute AS. In this case, a malicious user in AS 120 may cause traffic intended to be sent from AS 110 to AS 125 to be routed instead from AS 110 to AS 120 with the traffic never reaching AS 125.

To reduce the vulnerability of the communication network 100 to prefix hijacking an AS may include a prefix hijack mitigation server that is configured, in some embodiments, to prevent or reduce the effects of a prefix hijack attack on communication traffic destined for that AS. As shown in FIG.

1, AS 125 includes a prefix hijack mitigation server 150 that is configured with a hijack detection module 155, an AS hijacker candidate module 160, an affected region module 165, a reflector determination module 170, and a path redirect module 175.

The hijack detection module 155 is operable to detect prefix hijacking attacks in the communication network 100. Various techniques can be used to detect a prefix hijacking attack. The AS hijacker candidate module 160 is operable to determine, for a given source AS and destination AS, one or more candidate ASes that may be used by a prefix hijacker to launch an attack on that route. The set of candidate ASes that are generated may be reduced by eliminating any AS from the set that can be trusted to be hijacker free. The affected region module 165 is operable to identify, for each candidate AS identified by the AS hijacker candidate module 160, other ASes that include BGP routers that are likely to adopt a false route generated by the candidate AS. The set of ASes that is generated by the affection region module 165 may be called regional ASes or affected region ASes. The reflector determination module 170 is operable to determine one or more ASes that include BGP routing nodes that can be used to route traffic between the source AS and the destination AS without traversing any of the regional or affected region ASes. The path redirect module 175 is operable to redirect communication along the path that includes the one or more reflector ASes that include the reflector node(s). Various techniques can be used to redirect the communication traffic including IP anycast, location specific DNS, and/or Mobile IP.

The AS networks 110, 115, 120, 125, and 130 may represent a global network, such as the Internet, or other publicly accessible network. The networks 110, 115, 120, 125, and 130 or portions thereof may also, however, represent a wide area network, a local area network, an Intranet, or other private network, which may not accessible by the general public. Furthermore, the networks 110, 115, 120, 125, and 130 may represent a combination of public and private networks or a VPN. Moreover, the embodiments described herein are not limited to the type of CPE or device used to access the networks 110, 115, 120, 125, and 130.

Although FIG. 1 illustrates an exemplary communication network, it will be understood that the present invention is not limited to such configurations, but is intended to encompass any configuration capable of carrying out the operations described herein.

Figure 2:
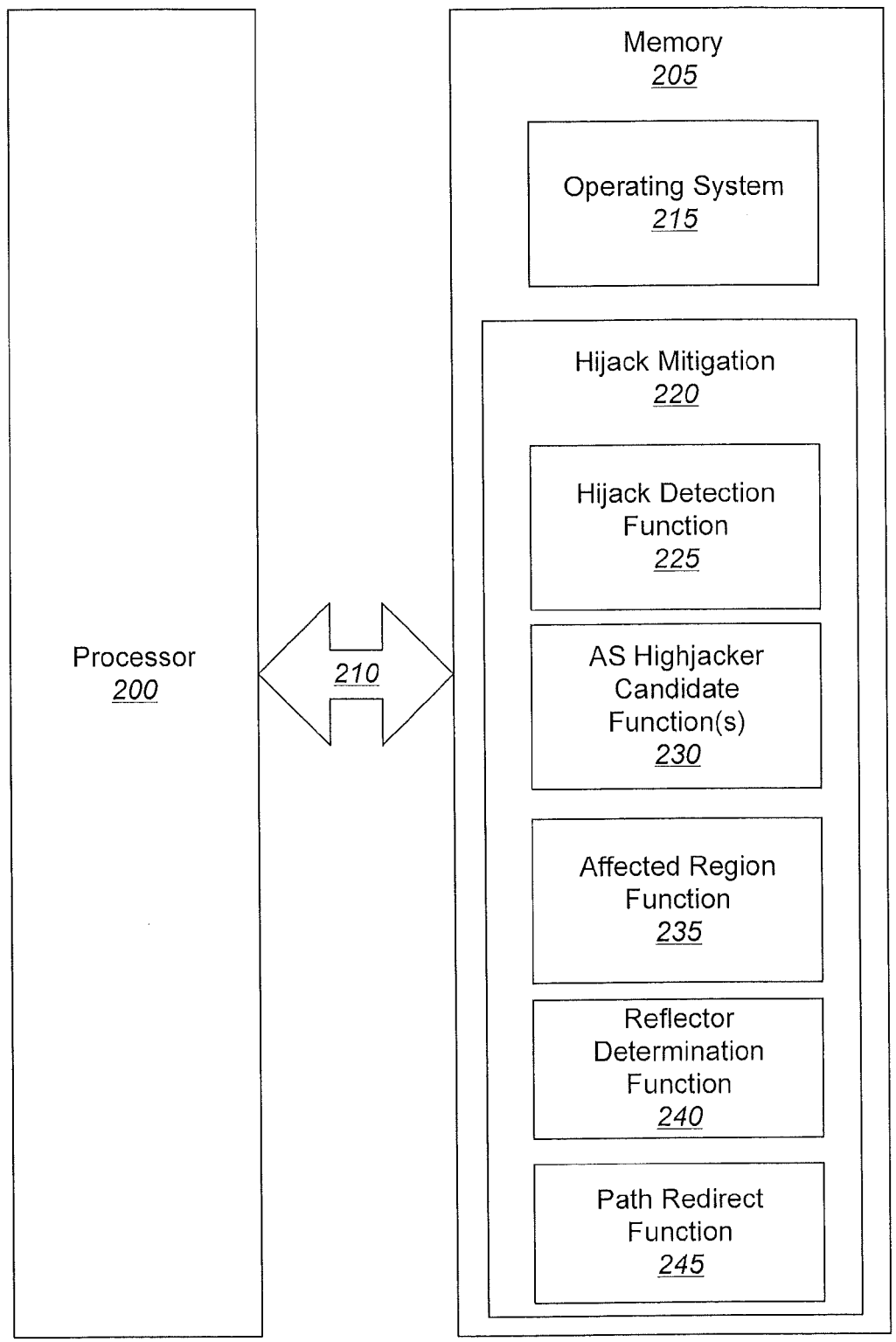
FIG. 2 is a block diagram that illustrates a software/hardware architecture for protecting an autonomous system from prefix hijacking attacks in accordance with some embodiments.

FIG. 2 illustrates a processor 200 and memory 205 that may be used in embodiments of the hijack mitigation server 150 of FIG. 1. The processor 200 communicates with the memory 205 via an address/data bus 210. The processor 200 may be, for example, a commercially available or custom microprocessor. The memory 205 is representative of the one or more memory devices containing the software and data used for protecting against prefix hijacking in accordance with some embodiments. The memory 205 may include, but is not limited to, the following types of devices: cache, ROM, PROM, EPROM, EEPROM, flash, SRAM, and DRAM.

As shown in FIG. 2, the memory 305 may contain up to two or more categories of software and/or data: an operating system 215 and a hijack mitigation module 220. The operating system 215 generally controls the operation of the switching system. In particular, the operating system 215 may manage the switching system's software and/or hardware resources and may coordinate execution of programs by the processor 200. The hijack mitigation module 220 may be configured to protect an AS against prefix hijack attacks. The hijack mitigation module 220 comprises a hijack detection function module 225, an AS hijacker candidate function module 230, an affected region function module 235, a reflector determination function module 240, and a path redirect function module 245, which may correspond to the hijack detection module 155, the AS hijacker candidate module 160, the affected region module 165, the reflector determination module 170, and the path redirect module 175, respectively, which were discussed above with respect to FIG. 1. The hijack detection function module 225 may be configured to detect the occurrence of prefix hijack attacks in the communication network. The AS hijacker candidate function module 230 may be configured to determine those ASes from which a prefix hijack attack may be launched for communication between a source AS and a destination AS. The affected region function module 235 may be configured to determine those ASes that have BGP routers that may adopt a false route generated by the candidate ASes for launching a prefix hijack attack for communication between the source AS and the destination AS. The reflector determination function 240 may be configured to determine one or more reflector ASes having BGP routing nodes therein that can be used to route communication traffic between the source AS and the destination AS without traversing any of the affected region or regional ASes determined by the affected region function 235. The path redirection function 245 may be configured to redirect traffic between the source AS and the destination AS to the reflector AS(s) nodes.

Although FIG. 2 illustrates exemplary hardware/software architectures that may be used in hijack mitigation servers, such as the hijack mitigation server 150 of FIG. 1, it will be understood that the present invention is not limited to such a configuration but is intended to encompass any configuration capable of carrying out operations described herein. Moreover, the functionality of the hijack mitigation server 150 of FIG. 1 and the hardware/software architecture of FIG. 2 may be implemented as a single processor system, a multi-processor system, or even a network of stand-alone computer systems, in accordance with various embodiments.

Computer program code for carrying out operations of switching systems discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Embodiments are described hereinafter with reference to flowchart and/or block diagram illustrations of methods, systems, apparatus, and/or computer program products in accordance with some embodiments. These flowchart and/or block diagrams further illustrate exemplary operations of protecting an AS from prefix hijacking attacks in accordance with various embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
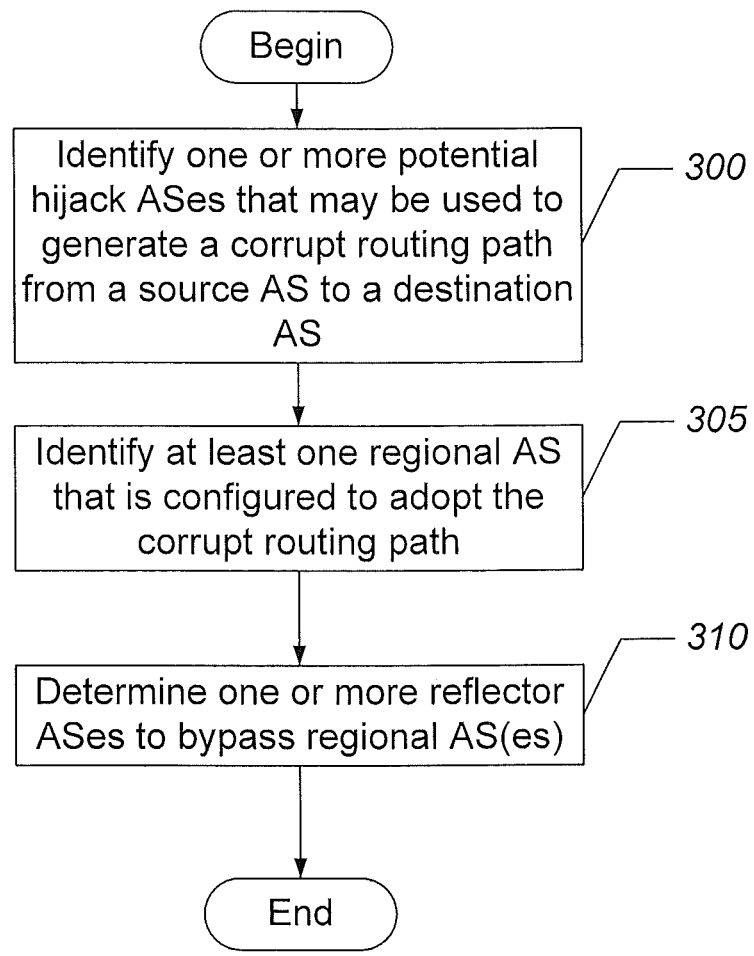
FIG. 3 is a flowchart that illustrates operations of methods, systems, and computer program for protecting an autonomous system from prefix hijacking attacks in accordance with some embodiments.

Operations for protecting an AS from a prefix hijacking attack, in accordance with some embodiments, will now be described with reference to the flowchart of FIG. 3 and the communication network diagram of FIG. 1. Referring now to FIG. 3, operations begin at block 300 where the hijack mitigation server 150 identifies one or more candidate ASes where a hijacker may launch an attack to corrupt a routing path between a given source AS and destination AS. At block 305, for each of the AS's identified at block 300, the hijack mitigation sever 150 identifies one or more regional ASes that may adopt a corrupt routing path generated by the respective AS identified at block 300. The hijack mitigation server 150 determines one or more reflector ASes that include BGP routers that can be used to bypass the regional ASes determined at block 305 when routing communication traffic between the source AS and the destination AS.

In some embodiments, the functionality provided by the destination AS may be mirrored at one or more nodes in mirror ASes so that the communication traffic need not be routed to the destination AS. Mirror ASes are selected in a similar fashion as reflector selection with the exception being that to qualify as a reflector AS both the source AS to reflector AS path and the reflector AS to destination AS path are not compromised by affected region ASes whereas to qualify to be a mirror AS it is only necessary that the source AS to mirror AS path is not compromised by affected region ASes.

In other embodiments, the hijack mitigation server 150 may be used to protect an AS from prefix hijack attacks for a defined percentage of communication traffic destined for the AS. In this regard, the hijack mitigation server 150 may determine one or more source ASes that generate sufficient communication traffic that the defined percentage threshold is met or exceeded. The operations of FIG. 3 may then be performed for each of the routing paths associated with the determined source ASes and the destination AS.

The flowchart of FIG. 3 illustrates the architecture, functionality, and operations of embodiments of methods, systems, and/or computer program products for protecting an AS from prefix hijacking attacks. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Embodiments for protecting an AS from prefix hijacking attacks are described in more detail hereafter.

Various techniques can be used for prefix hijack detection and hijacker location as discussed above. Moreover, it is assumed that there is a reasonably accurate AS level topology available. Such a topology may be derived from BGP table route entries collected from a number of BGP routers.

Some embodiments may provide a per-customer service that an Internet Service Provider (ISP) may offer to its customer to protect incoming traffic towards the customer's prefix d from a particular source s. Because the source in this scenario is typically a customer of the ISP customer, even this simplest service from the ISP may be appealing to its customers because these customers can protect their services availability for their most important customers. More complex prefix hijacking mitigation services can be constructed and optimized based on this basic building block. For example the ISP may offer to protect the top XX% volume generating sources for a particular customer of the ISPs. The ISP may also offer this type of services to multiple customers. Resources deployed for mitigating prefix hijacking for multiple customers and multiple sources can be aggregated and deployed coherently.

As used herein, destination IP address and destination prefix are not explicitly distinguished because from a routing point of view there are no single IP addresses, only IP address prefixes. In addition, because prefix hijacking is specific to the inter-domain routing infrastructure of the Internet, which only deals with AS level topology and not finer granularity entities, such as individual computers, each of which is addressable by a single IP address, or individual routable networks, each of which is addressable by IP prefix, AS and these finer granularity entities are not always explicitly distinguished as used herein. The term "hijacking" is also used rather loosely. Specifically the objects of hijacking attacks are traffic flows. A single attack's object is the traffic flows from a source region to a specific destination prefix. Any traffic flow from a single source in this source region to the destination prefix is also covered as the object of the hijacking attack.

For a given source s and destination d, the ISP is able to compute where a potential hijacker would have to be to successfully hijack the corresponding source-s-to-prefix-d traffic. That is, the source-s-to-prefix-d path must pass through the affected region of the hijacking. Using the Internet's AS topology and route preference properties such as the "valley free" property and the "prefer-shorter-path" property, the ISP is able to perform such computation. The result is the set of possible locations for a successful hijacker is denoted as H(s,d):

$H_{s,d}$=the set of potential locations that a hijacker is at such a location it can successfully hijack traffic from source s to prefix d.

Trimming of $H_{s,d}$ is possible if certain locations can be trusted to be hijacker-free. Such locations may be removed from $H_{s,d}$ before the next processing step.

For each $h_i \in H_{s,d}$ there is an affected region in which the BGP routers adopt the false route generated by the i-th hijacker $h_i$, denoted as $A_i(h_i)$ to replace their legit route entries for the destination d. The union of all $A_i(h_i)$ is denoted as $$A_{s,d} \equiv \bigcup_i A_i(h_i).$$

The next step is to find a reflector location r for source s that neither the source-s-to-reflector-r-path nor that reflector-r-toprefix-d-path is hijack-able by any of the hijackers that can successfully hijack the source-s-to-prefix-d path. That is, both the s-to-r-path and the r-to-d-path must be outside of $A_{s,d}$. Such a set of reflector locations is denoted as $R_{s,d}$. Any reflector located at a location r that $r \in R_{s,d}$ can be used for mitigating prefix hijacking attacks that hijacks the communications from s to d. Embodiments of the hijack mitigation technique redirect traffic from s to d towards r, which then forwards such traffic to d. Because both the s-to-r-path and the r-to-d-path are outside of the affected region of any hijacker that could hijack the s-to-d-path, packets from s to d can be forwarded this way indirectly to reach d without being hijacked. Redirecting service requests can be performed using a number of known methods in their native forms or their modified forms. Examples of such methods include IP anycast, location specific DNS, or Mobile IP like redirecting. Depending on the particular services a to-be-protected customer prefix is providing, it is also possible to deploy hosted mirror sites for the customer at the identified mirror locations. Different from computing the $R_{s,d}$'s for reflectors, there is no need to consider if the mirror-to-prefix path can be hijacked. During prefix hijacking mitigation, service requests from affected sources are redirected to one of the mirror sites which can directly serve such requests without needing to forward them further to the original customer site.

The above described methods are capable of mitigating prefix hijacking attacks launched from a single attacker AS. It is possible for an attacker to organize synchronized attacks from multiple ASes. In this case the robustness of the embodiments described herein depends on the number of locations of the reflectors. Generally speaking, the more reflectors are deployed at diversified locations on the global Internet, the more difficult it is for such synchronized attacks to be effective. The reason is that unless all reflectors are affected by such a synchronized attack, the attack can still be mitigated. However, the mitigation effectiveness of the present embodiments can be reduced by large scale synchronized prefix hijacking attacks because multiple hijack attacks may result in no effective reflector location for certain sources.

It is generally not efficient to plan to protect traffic from all possible source to the destination prefix because this includes the whole Internet. A way to improve the efficiency of the mitigation service is to optimize the system to protect traffic from the more "important" sources. For example, a simple interpretation of "importance" of a source is derived from the volume of the traffic from this source to the destination prefix. Because the ISP is carrying incoming traffic for its customers, it is possible for the ISP to quantitatively identify the distribution of incoming traffic volume for any customer prefix in terms of where the sources are and how much each source contributes to the overall incoming traffic volume for the customer prefix. Based on this information, the ISP is able to construct services that offer a customer with a quantitative level of service for mitigating prefix hijacking targeting at the customer prefix. The construction of such service is described as follows:

With a target service protection probability threshold, e.g. protecting 98% of the incoming service requests for the protected customer d, the ISP is able to produce a list of top volume sources $S_d$ in that the total service request volume from sources in $S_d$ towards the target prefix d exceeds the said threshold. There are many ways to produce such a set meeting the threshold requirement. The top-contributor-method is the one that results in a minimum set of sources that would produce an aggregated service request volume exceeding the threshold.

It is worth noting that there are many ways of defining "service requests." As used herein, "service request" is interpreted in its most general sense: incoming traffic volume in number of bits or in number of packets. Other "service request" interpretations will likely result in different numbers and results however the same methodology is still applicable. It is also worth noting that here only the volume distribution with respect to the total incoming traffic that is carried by the protection providing ISP is considered, excluding other ISPs if the customer also employs redundant Internet service links from other ISPs.

After the source list $S_d$ is obtained, the ISP can apply the above-described basic methodology for each individual source $s_j \in S_d$ to produce the reflector location set $R_{s_j,d}$ for sj. The largest possible overall reflector set is the union of all $R_{s_j,d}$'s:

$$OR_d = \bigcup_{s_j \in S_d} R_{s_j,d}.$$

It is reasonable to perform optimization on $OR_d$ depending on optimization objectives. For instance, to reduce the number of reflector locations employed by the mitigation service reflector locations that can protect more sources may be preferred. In other words, the minimum overall reflector set $OR_d$ is the minimum set with which $OR_d \cap R_{s_j,d} \neq \emptyset$ for any $s_j \in S_d$.

Many variations and modifications can be made to the embodiments without substantially departing from the principles of the present invention. All such variations and modifications are intended to be included herein within the scope of the present invention, as set forth in the following claims.

That which is claimed:

1. A method of operating a communication network, comprising:
   identifying a plurality of potential hijack autonomous systems that can be used to generate a corrupt routing path from a source autonomous system to a destination autonomous system;
   for each of the plurality of potential hijack autonomous systems:
      identifying a regional autonomous system that is to adopt the corrupt routing path from the source autonomous system to the destination autonomous system; and
      determining a reflector autonomous system set such that, for each reflector autonomous system in the set, a source autonomous system to reflector autonomous system routing path and a reflector autonomous system to destination autonomous system routing path do not comprise the regional autonomous system; then
   identifying one of the reflector autonomous systems that is common among the reflector autonomous system sets responsive to performing the identifying and determining operations for each of the plurality of potential hijack autonomous systems;
   detecting that the routing path from the source autonomous system to the destination autonomous system has been corrupted;
   directing communication traffic from the source autonomous system to the destination autonomous system through the one of the reflector autonomous systems that was identified;
   determining, for each of the plurality of potential hijack autonomous systems, a mirror autonomous system set such that, for each mirror autonomous system in the set, a source autonomous system to mirror autonomous system routing path does not comprise the regional autonomous system; and identifying a mirror autonomous system that is common among the mirror autonomous system sets responsive to performing the identifying and determining the mirror autonomous system set operations for each of the plurality of potential hijack autonomous systems.

2. The method of claim 1, further comprising:

mirroring functionality provided for the destination autonomous system at the mirror autonomous system that was identified;

detecting that the routing path from the source autonomous system to the destination autonomous system has been corrupted; and re-directing communication traffic from the source autonomous system destined for the destination autonomous system to the mirror autonomous system that was identified without forwarding to the destination autonomous system.

3. The method of claim 1, further comprising:

wherein a sum of communication traffic from the source autonomous system exceeds a defined threshold.

4. The method of claim 1, wherein identifying the plurality of potential hijack autonomous systems comprises:

identifying the plurality of potential hijack autonomous systems based on routing preference rules used in the communication network.

5. The method of claim 4, wherein the routing preference rules are based on at least one of autonomous system hop count and autonomous system relationship information; and wherein the autonomous system relationship information specifies at least one of customer, peer, and provider relationship information between autonomous systems.

6. The method of claim 1, wherein identifying the regional autonomous system that is to adopt the corrupt routing path for each of the plurality of potential hijack autonomous systems comprises:

identifying the regional autonomous system that is to adopt the corrupt routing path for each of the plurality potential hijack autonomous systems based on routing preference rules used in the communication network.

7. A system for operating a communication network, comprising:

a hijack mitigation server to identify a plurality of potential hijack autonomous system that can be used to generate a corrupt routing path from a source autonomous system to a destination autonomous system, for each of the plurality of potential hijack autonomous systems:

identify a regional autonomous system to adopt the corrupt routing path from the source autonomous system to the destination autonomous system; and determine a reflector autonomous system set such that, for each reflector autonomous system in the set, a source autonomous system to reflector autonomous system routing path and a reflector autonomous system to destination autonomous system routing path do not comprise the regional autonomous system, then identify one of the reflector autonomous systems that is common among the reflector autonomous system sets responsive to performing the identifying and determining operations for each of the plurality of potential hijack autonomous systems;

wherein the hijack mitigation server is further to detect that the routing path from the source autonomous system to the destination autonomous system has been corrupted and to direct communication traffic from the source autonomous system to the destination autonomous system through the one of the reflector autonomous systems that was identified;

wherein the hijack mitigation server is further to determine, for each of the plurality of potential hijack autonomous systems, a mirror autonomous system set such that, for each mirror autonomous system in the set, a source autonomous system to mirror autonomous system routing path does not comprise the regional autonomous system and to identify a mirror autonomous system that is common among the mirror autonomous system sets responsive to performing the identifying and determining the mirror autonomous system set operations for each of the plurality of potential hijack autonomous systems.

8. The system of claim 7, wherein the hijack mitigation server is further to mirror functionality provided for the destination autonomous system at the mirror autonomous system that was identified, to detect that the routing path from the source autonomous system to the destination autonomous system has been corrupted, and to re-direct communication traffic from the source autonomous system destined for the destination autonomous system to the mirror autonomous system that was identified without forwarding to the destination autonomous system.

9. The system of claim 7, wherein a sum of communication traffic from the source autonomous system exceeds a defined threshold.

10. The system of claim 7, wherein the hijack mitigation server is further to identity the plurality of potential hijack autonomous systems by identifying the plurality of potential hijack autonomous systems based on routing preference rules used in the communication network.

11. The system of claim 10, wherein the routing preference rules are based on at least one of autonomous system hop count and autonomous system relationship information; and wherein the autonomous system relationship information specifies at least one of customer, peer, and provider relationship information between autonomous systems.

12. The system of claim 7, wherein the hijack mitigation server is further to identify the regional autonomous system that is to adopt the corrupt routing path for each of the plurality of potential hijack autonomous system by identifying the regional autonomous system that is to adopt the corrupt routing path for each of the plurality of potential hijack autonomous system based on routing preference rules used in the communication network.

13. A computer program product for operating a communication network, comprising:

a non-transitory computer readable storage medium having computer readable program code embodied in the computer readable storage medium, the computer readable program code comprising:

computer readable program code to identify a plurality of potential hijack autonomous systems that can be used to generate a corrupt routing path from a source autonomous system to a destination autonomous system;

for each of the plurality of potential hijack autonomous system:

computer readable program code to identify a regional autonomous system that is to adopt the corrupt routing path from the source autonomous system to the destination autonomous system; and computer readable program code to determine a reflector autonomous system set such that, for each reflector autonomous system in the set, a source autonomous system to reflector autonomous system routing path and a reflector autonomous system to destination autonomous system routing path do not comprise the regional autonomous system; and computer readable program code to then identify a reflector autonomous system that is common among the at least one reflector autonomous system set responsive to performing the identifying and determining operations for each of the plurality of potential hijack autonomous systems;

computer readable program code to detect that the routing path from the source autonomous system to the destination autonomous system has been corrupted;

computer readable program code to direct communication traffic from the source autonomous system to the destination autonomous system through the one of the reflector autonomous systems that was identified;

computer readable program code to determine, for each of the plurality of potential hijack autonomous systems, a mirror autonomous system set such that, for each mirror autonomous system in the set, a source autonomous system to mirror autonomous system routing path does not comprise the regional autonomous system; and computer readable program code to identify a mirror autonomous system that is common among the mirror autonomous system sets responsive to identifying and determining the mirror autonomous system set for each of the plurality of potential hijack autonomous systems.

* * * * *